United States Patent
Byzio et al.

(10) Patent No.: US 10,536,043 B2
(45) Date of Patent: Jan. 14, 2020

(54) MODULAR UNIT COMPRISING A LAMINATE STACK FOR AN ELECTRIC MACHINE, METHOD FOR PRODUCING SUCH A MODULAR UNIT, AND ELECTRIC MACHINE

(71) Applicant: ZF FRIEDRICHSHAFEN AG, Friedrichshafen (DE)

(72) Inventors: Bernard Byzio, Thundorf (DE); Walter Wolf, Werneck (DE); Erhard Wehner, Wasserlosen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 322 days.

(21) Appl. No.: 15/302,883

(22) PCT Filed: Mar. 12, 2015

(86) PCT No.: PCT/EP2015/055124
§ 371 (c)(1),
(2) Date: Oct. 7, 2016

(87) PCT Pub. No.: WO2015/154938
PCT Pub. Date: Oct. 15, 2015

(65) Prior Publication Data
US 2017/0040852 A1    Feb. 9, 2017

(30) Foreign Application Priority Data

Apr. 9, 2014 (DE) .................. 10 2014 206 848

(51) Int. Cl.
*H02K 1/18* (2006.01)
*H02K 15/14* (2006.01)

(52) U.S. Cl.
CPC ............. *H02K 1/185* (2013.01); *H02K 1/187* (2013.01); *H02K 15/14* (2013.01); *H02K 2201/09* (2013.01)

(58) Field of Classification Search
CPC ........ H02K 1/185; H02K 1/187; H02K 15/14; H02K 2201/09
(Continued)

(56) References Cited

U.S. PATENT DOCUMENTS 2,488,458 A * 11/1949 Walton .................. H02K 1/185
164/DIG. 10
2,523,520 A * 9/1950 Reinhard ............... H02K 1/185
310/216.129
(Continued)

FOREIGN PATENT DOCUMENTS

DE      29 35 922       4/1981
DE      29 36 020       4/1981
(Continued)

*Primary Examiner* — Jeremy A Luks
(74) *Attorney, Agent, or Firm* — Cozen O'Connor

(57) ABSTRACT

A component unit for an electric machine includes an annular lamination stack formed of a plurality of axially stacked laminations. The lamination stack is secured by an inner or outer cylindrical fastening portion to a cylindrical receiving portion of a carrier element. The carrier element has two stops between which the lamination stack is axially clamped in a frictionally engaging manner. At least one of the axial stops has an annular supporting element arranged at the receiving portion and supports the lamination stack and which is fixed at the carrier element by at least one caulking region.

10 Claims, 6 Drawing Sheets

(58) Field of Classification Search
USPC .................................................. 310/216.125
See application file for complete search history.

(56) References Cited

U.S. PATENT DOCUMENTS

| | | | | |
|---|---|---|---|---|
| 2,810,847 | A * | 10/1957 | Tweedy | H02K 1/185 310/216.004 |
| 3,512,024 | A * | 5/1970 | Papa | H02K 5/04 29/609 |
| 4,263,710 | A | 4/1981 | Marracino et al. | |
| 5,598,626 | A * | 2/1997 | Eddy | H02K 15/0006 29/426.3 |
| 5,907,208 | A * | 5/1999 | Kristen | H02K 13/006 310/216.115 |
| 6,104,570 | A * | 8/2000 | Pelstring | G11B 17/038 360/98.07 |
| 6,337,530 | B1 | 1/2002 | Nakamura et al. | |
| 8,299,690 | B2 * | 10/2012 | Hayakawa | H02K 1/185 310/216.008 |
| 8,451,557 | B2 * | 5/2013 | Nagai | G11B 19/2018 360/97.19 |
| 9,837,113 | B2 * | 12/2017 | Takemoto | G11B 19/2009 |
| 9,876,414 | B2 * | 1/2018 | Yoshida | H02K 5/08 |
| 2011/0227446 | A1 * | 9/2011 | Vedy | H02K 1/16 310/216.118 |
| 2014/0091660 | A1 * | 4/2014 | Smirnov | H02K 5/165 310/90 |
| 2017/0012487 | A1 * | 1/2017 | Brandl | H02K 1/185 |
| 2017/0141628 | A1 * | 5/2017 | Nose | B21D 28/26 |
| 2017/0284396 | A1 * | 10/2017 | Fukasaku | F04C 18/0215 |
| 2018/0152060 | A1 * | 5/2018 | Rasmussen | H02K 1/14 |

FOREIGN PATENT DOCUMENTS

| | | | |
|---|---|---|---|
| DE | 102 58 606 | 6/2004 | |
| GB | 2059177 A * | 4/1981 | ............ H02K 1/185 |
| JP | 2006 25 465 | 1/2006 | |

* cited by examiner

MODULAR UNIT COMPRISING A LAMINATE STACK FOR AN ELECTRIC MACHINE, METHOD FOR PRODUCING SUCH A MODULAR UNIT, AND ELECTRIC MACHINE

CROSS REFERENCE TO RELATED APPLICATIONS

This is a U.S. national stage of application No. PCT/EP2015/055124, filed on Mar. 12, 2015. Priority is claimed on German Application No.: DE102014206848.7, filed Apr. 9, 2014, the content of which is incorporated here by reference.

BACKGROUND OF THE INVENTION

1. Field of the Invention

The present invention is directed to a component unit with a lamination stack for an electric machine, a method for the production of a component unit of this type, and to an electric machine having a component unit of this type.

2. Description of the Prior Art

The electromagnetic components of electric machines frequently comprise lamination stacks of magnetizable electrical steel. To prevent eddy current losses, lamination stacks of this type are built from a plurality of axially staggered laminations that are connected to one another, for example, either with a thermosetting varnish or through in-die stacking lugs engaging one inside the other. The lamination stack can function as a rotor lamination stack or stator lamination stack and is arranged on a cylindrical rotor carrier or stator carrier so as to be fixed with respect to relative rotation, for example, by an interference fit. During operation of the electric machine, the fitting situation may change under the influence of a change in temperature with the result that particularly the front areas of a lamination stack will fan out axially and laminations will protrude singly from the lamination stack. This adversely affects the efficiency of an electric machine of this type.

A generic component unit for an electric machine constructed as an inrunner and having a stator lamination stack that is fixed to the inner circumferential surface of a housing of the machine is known from DE 102 58 606 A1. An axial stop of the lamination stack is formed by a diameter step of the housing, while the other axial side of the lamination stack is formed by an annular collar of an end shield which is detachably arranged at the housing. In this way, the laminations of the lamination stack are permanently clamped axially and are prevented from fanning out.

The component unit for an electric machine known from JP 2006 25 465 A1 is based on the same principle for axially fixing the lamination stack, whereby a stop is formed through an annular element screwed to the machine housing and compresses the lamination stack axially in direction of a further housing stop.

SUMMARY OF THE INVENTION

It is an object of the present invention to disclose a component unit for an electric machine of the type mentioned above in which the lamination stack is permanently axially fixed to its carrier element and in which a fanning out of individual laminations is reliably prevented.

According to a first aspect of the present invention, a component unit is suggested for an electric machine in which one of the axial stops for fixing the lamination stack comprises an annular supporting element arranged together with the lamination stack at the receiving portion of the carrier element, and the lamination stack is supported against the latter. The supporting element is fixed at the carrier element by at least one caulking region.

The lamination stack can be constructed as a rotor lamination stack and/or as a stator lamination stack whose laminations are preferably connected to one another by in-die stacking or through the action of a thermosetting varnish. The lamination stack can be formed of individual, circumferentially continuous annular laminations with a yoke area and with a toothed winding region. This winding region includes teeth and grooves arranged between the teeth and into which a stator winding can be inserted. Alternatively, the lamination stack can be constructed to be segmented in circumferential direction, an annular lamination stack being formed by joining segments of this type. The lamination stack can also be constructed without windings and can possibly also have a receiving region for permanent magnets.

The invention can be realized for all electric machines with a lamination stack independently of the specific mode of construction and the respective principle of operation. The supporting element is preferably formed as supporting ring or as a circular supporting disk and is preferably produced from steel, its thickness being greater than a lamination thickness and preferably 2-5 lamination thicknesses. The supporting element can preferably be circumferentially continuous but, alternatively, can also be segmented, i.e., formed of a plurality of parts.

The lamination stack is arranged with its cylindrical fastening portion fixed to rotate with a likewise cylindrical receiving portion of the carrier element. To this end, a press fit of the parts is preferably carried out. This can be carried out either through a longitudinal press fit by axial interference fit, through a transverse press fit by shrinking, or through a combination of the above-mentioned pass fits in that the two parts to be connected are tempered differently before being joined together. When the parts to be connected are joined, the lamination stack is pushed axially onto the carrier element until it abuts at a first stop.

The press fit, particularly a transverse interference fit, is generated after assembling by the temperature equalization taking place. The supporting element serves to axially secure the lamination stack and, during assembly of the unit, is likewise received by the receiving area of the carrier element and is preferably made to contact the free front side of the lamination stack at least indirectly. A caulking region or a plurality of caulking regions distributed along the circumference of the supporting element in which basic material of the carrier element and/or of the supporting element is plastically displaced is generated for fixing the arrangement. A certain radial overlapping of carrier element and supporting element is achieved in this way. During the caulking, the supporting ring absorbs the radial forces which otherwise act directly on the lamination stack and accordingly prevents the end laminations of the lamination stack from creeping out and being offset. In this way, the lamination stack and the carrier element thereof are permanently fixed to one another in a reliably operating manner and a fanning out of the lamination stack is prevented at the same time.

In order to achieve a high axial clamping over the long term, the lamination stack is fitted to the carrier element by an assembly aid so as to be axially preloaded already, and this assembly aid is not removed until the caulking regions have been produced.

According to one embodiment, the caulking regions can be constructed directly at the carrier element, for which purpose the carrier element can preferably be constructed from a plastically, comparatively easily deformable material, for example, an aluminum material. The carrier element may be in the form of an aluminum stator carrier or rotor carrier, for example. In particular, in case of an electric inrunner machine, the stator carrier can be constructed as the housing of the machine at the same time. The stator lamination stack can accordingly be secured, e.g., to an aluminum transmission housing. With regard to the implementation of a press fit, the carrier element in this case has a different thermal expansion coefficient than the lamination stack, in particular a thermal expansion coefficient which differs by a factor of 2, which leads to a variation in the fit force depending on temperature. In this regard, the supporting element can be produced from a steel material.

In a construction of a caulking region or of a plurality of caulking regions at the carrier element, the carrier element can be formed at the intended position with a contour that is advantageous for the engagement of a caulking tool and also with a material portion that is weakened compared to a base body to facilitate the plastic deformation. A portion of this type can be formed, for example, by a collar that protrudes axially over the lamination stack, has a comparatively small wall thickness, and can be permanently deformed by caulking at least partially radially in direction of the lamination stack. A correspondingly constructed pressing tool or caulking tool for achieving a high area pressure at least at the start of the deforming process can advantageously be brought into a line contact or point contact with the carrier or supporting element.

However, for example, in case a stator carrier or rotor carrier is produced from steel material, it can also be advantageous to produce the caulking regions at the supporting element. In this case, the supporting element can preferably be constructed from a plastically, comparatively easily deformable material, for example an aluminum material.

Also, an advantageous contour can be formed at the supporting element for caulking, and during caulking a deformable portion is plastically deformed by material displacement into a receiving contour of the carrier element and is axially supported therein.

The lamination stack is preferably secured to the receiving portion of the carrier element by a yoke area, this yoke area being at least partially radially overlapped by the supporting element. When a stator lamination stack is fitted to a stator carrier, a stator winding is already arranged on a tooth area of the lamination stack so that only a radially narrow engagement space is accessible for engagement of a caulking tool or pressing tool.

The caulking region can be constructed in circumferential direction of the carrier element as an individual caulking region along the entire circumference or over a partial area and also in one process step or in a plurality of process steps. According to one embodiment, a plurality of caulking regions can be constructed in circumferential direction of the lamination stack. Dividing the circumferential area into a plurality of caulking regions reduces the surface area to be deformed in a process step and accordingly increases the area pressure at a caulking region at a determined force applied by a caulking tool. The area pressure can be increased still more in that a total number of caulking regions to be introduced is divided sequentially into at least two or even more caulking processes or process steps, and the lamination stack with its carrier is rotated therebetween in circumferential direction by a determined angular amount relative to the caulking tool. The caulking regions are generated in groups in this way.

One of the two axial stops for the lamination stack can preferably be formed integrally with the carrier element, particularly through an annular shoulder at the receiving region of the carrier element. Alternatively, a stop can also be provided by an add-on element fixedly connected to the carrier element.

Optionally, the lamination stack can comprise a sleeve element, particularly a metal sleeve element, arranged on the fastening portion of the lamination stack and can be arranged together with the sleeve element at the receiving portion of the carrier element.

A method for producing a component unit for an electric machine includes the following steps:
  providing an annular lamination stack comprising a plurality of laminations, which lamination stack is optionally made up of a plurality of circumferential segments,
  applying an axial, frictionally engaging clamping to the lamination stack by an assembly tool,
  axially joining the lamination stack with a carrier element until the lamination stack abuts a first axial stop of the carrier element while maintaining the frictionally engaging clamping, and an interference fit is optionally formed between the joined members,
  introducing a supporting element at the axial side of the lamination stack opposite the first stop,
  generating a second axial stop through at least one caulking region by means of caulking the carrier element or the supporting element, and
  detaching the assembly tool.

Also suggested is an electric machine with a stator and a rotor which is supported so as to be rotatable around an axis A relative to the stator. At least the rotor or the stator comprises a component unit according to the above constructions.

BRIEF DESCRIPTION OF THE DRAWINGS

The invention will be described by way of example in the following referring to embodiment forms shown in the drawings.

The drawings show in partial sectional views.

DETAILED DESCRIPTION OF THE PRESENTLY PREFERRED EMBODIMENTS

Figure 1:
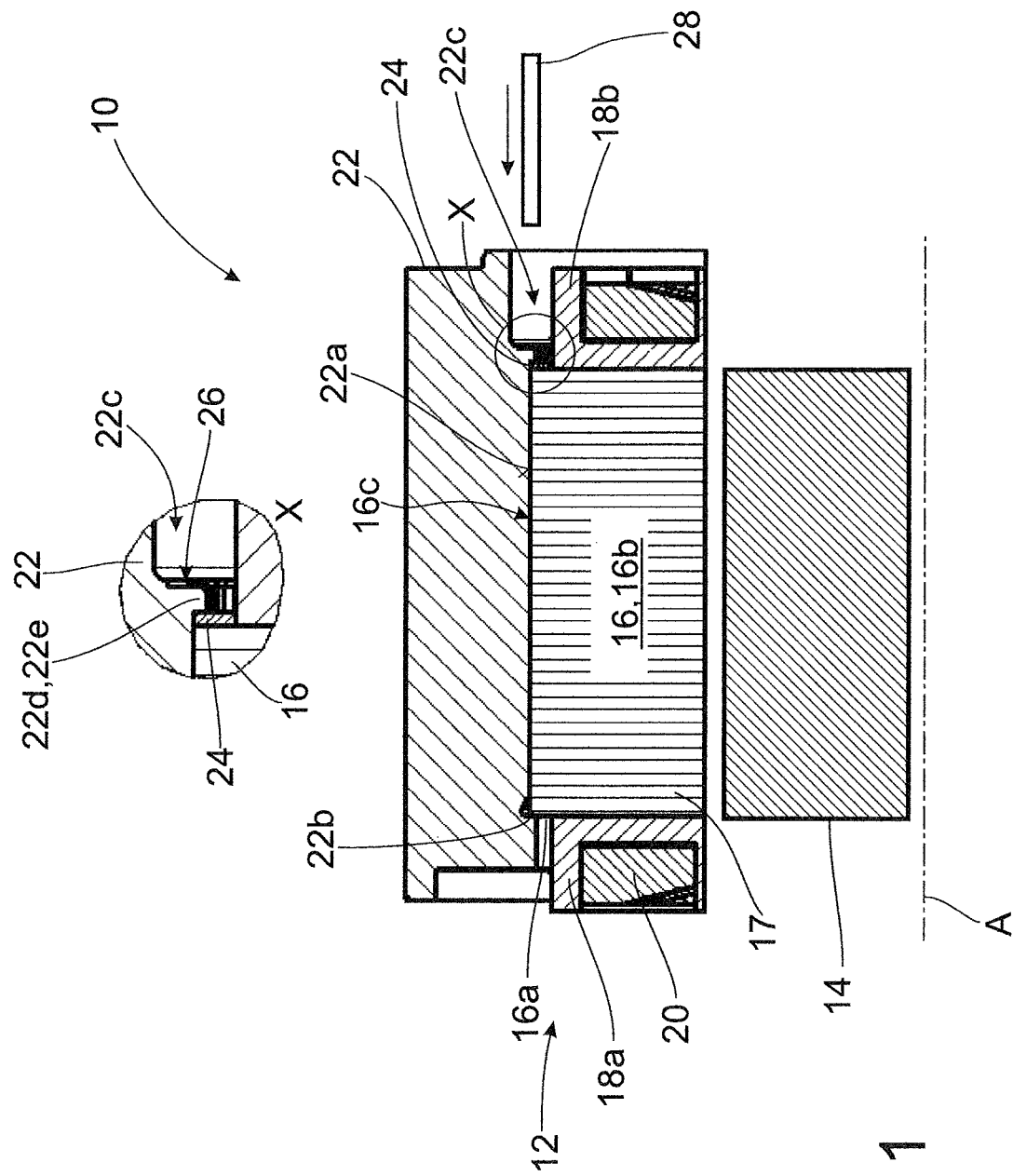
FIG. 1 is a stator component unit of an electric machine with a lamination stack secured to a carrier element together with a supporting element by a caulking region (radial retaining projection) formed at the carrier element.

Like objects, functional units or comparable components are denoted by identical reference numerals throughout the different drawings. Further, collective reference numerals may be used for components and objects which occur more than once in an embodiment example or diagram but which are described collectively with respect to one or more features. Components or objects which are denoted by identical reference numerals or collective reference numerals may be constructed identically or possibly also differently with respect to one or more or all features, for example, their dimensions, unless otherwise explicit or implicit from the description.

The drawings show an electric machine 10 with a stator 12 and a rotor 14 which is supported so as to be rotatable relative to the stator 12 around an axis A. The stator 12 or stator component unit 12 will be described more fully by way of example in the following. This component unit 12 comprises an annular lamination stack 16 made up of a plurality of stator segments joined in circumferential direction. These stator segments are not visible in the views shown. Each stator segment is formed of a plurality of axially stacked laminations 17. Each of the stator segments comprises a yoke area 16a and a tooth 16b which projects radially from the latter and which carries a stator coil 20 supported at the front side by winding bodies 18a, b. In this way, the individual yoke areas of the segments form an annularly continuous yoke 16a of the lamination stack 16.

The lamination stack 16, which is assembled to form a ring, is secured to a radially inner cylindrical receiving portion 22a, particularly the inner cylindrical surface 22a of a carrier element 22 formed in this instance as a stator housing 22, by an interference fit with an outer cylindrical fastening portion 16c, particularly with the outer cylindrical surface 16c. While housing 22 is formed of an aluminum material, the lamination stack 16 is formed of an electrical steel, i.e., iron material. Accordingly, the carrier element 22 has a different thermal expansion coefficient, in the present case a larger thermal expansion coefficient, than the lamination stack 16.

Further, the carrier element 22 has a first stop 22b and a second stop 22c, between which the lamination stack 16 is secured as to be axially clamped in a frictionally engaging manner. The first stop 22a for the lamination stack 16 is formed integrally with the carrier element 22, in this case particularly by an annular shoulder 22b at the receiving region 22a of the carrier element 22.

The second stop 22c comprises an annular supporting element 24 arranged at the receiving portion 22a and supports the lamination stack 16 secured to the carrier element 22 by at least one caulking region 26. Accordingly, the lamination stack 16 is secured by its yoke area 16a to the receiving portion 22a of the carrier element 22, and the yoke area 16a is at least partially radially overlapped by the supporting element 24.

In the described embodiment example according to FIG. 1, the caulking region 26 is formed at the carrier element 22 itself in that a portion 22d projecting axially beyond the lamination stack 16 at the receiving portion 22a is plastically deformed by an axially acting pressing tool 28 represented schematically in this instance by a die. In this regard, at least one radial overlapping portion 22e of the carrier element 22 or a radial retaining projection 22e, respectively, is produced. In the present case, a plurality of overlapping portions 22e of this kind are generated that act axially on the supporting element 24 and clamp the lamination stack 16 in an axially frictionally engaging manner between the stops 22c, 22d.

Figure 2:
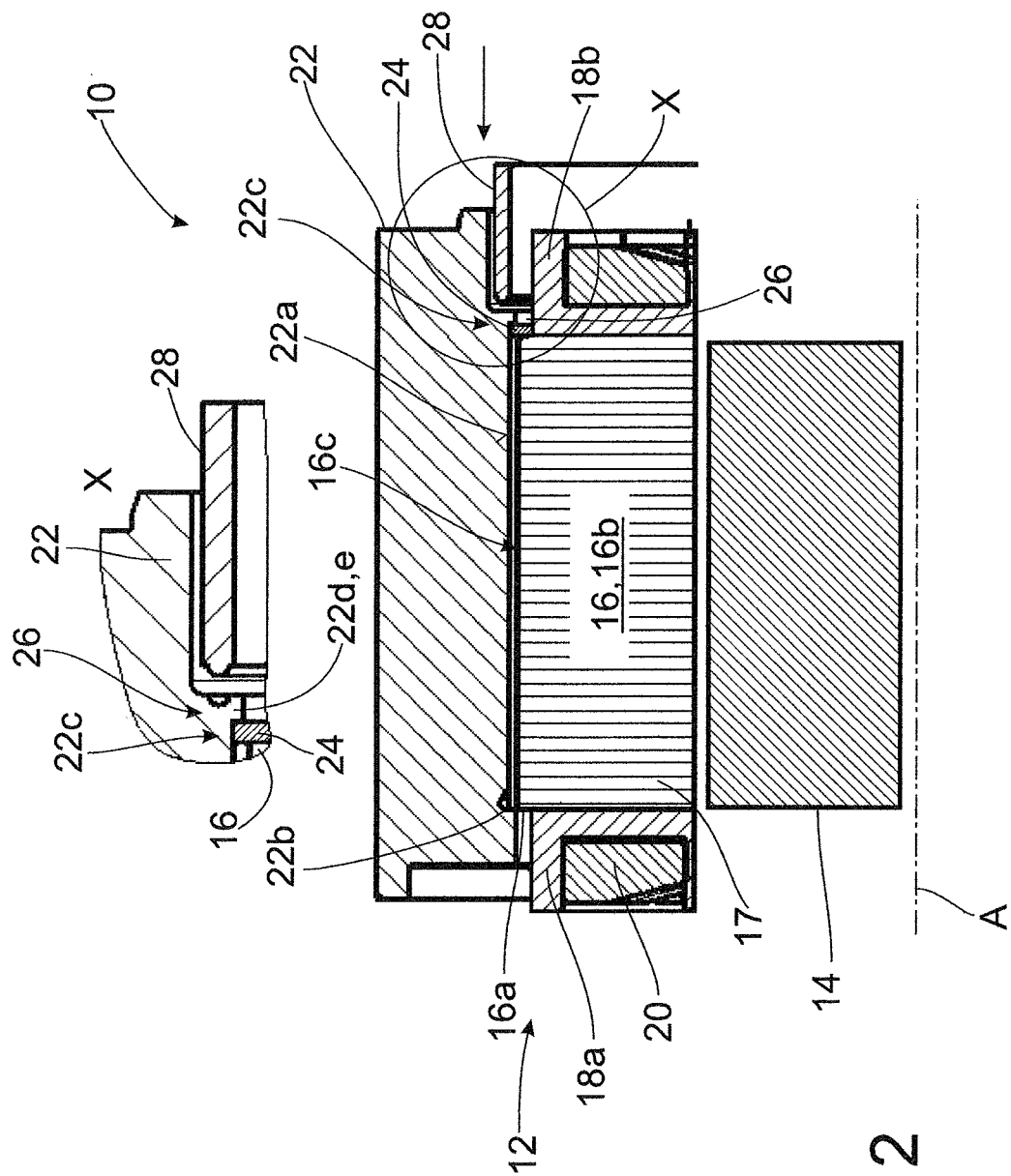
FIG. 2 is a stator component unit according to FIG. 1 in which a caulking tool with a line contact contour or point contact contour is used.

FIG. 2 shows a stator component unit 12 according to FIG. 1 in which a caulking tool 28 with a line-shaped or point-shaped contact contour is used to increase area pressure at the start of the deformation process.

Figure 3:
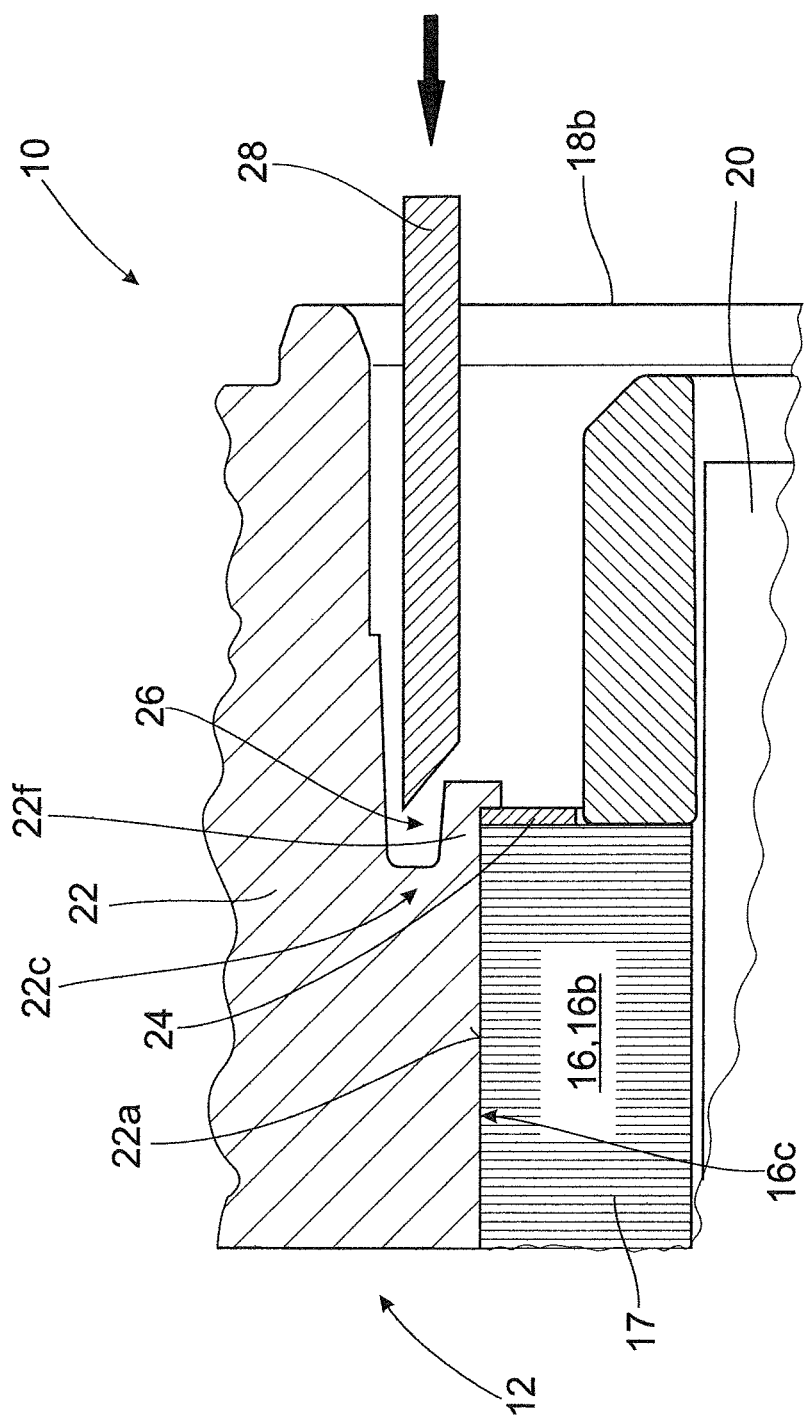
FIG. 3 is a stator component unit according to FIG. 1 in which a caulking region is formed at a collar extending axially over the lamination stack.

A further stator component unit 12 according to FIG. 1 is shown in FIG. 3. In this case, however, a caulking region 26 is formed at a comparatively thin-walled collar 22f of the carrier element 22 extending axially over the lamination stack 16. A blade-shaped or wedge-shaped pressing tool 28 with a flank extending obliquely with respect to the operative direction is used to form the caulking region 26.

Figure 4:
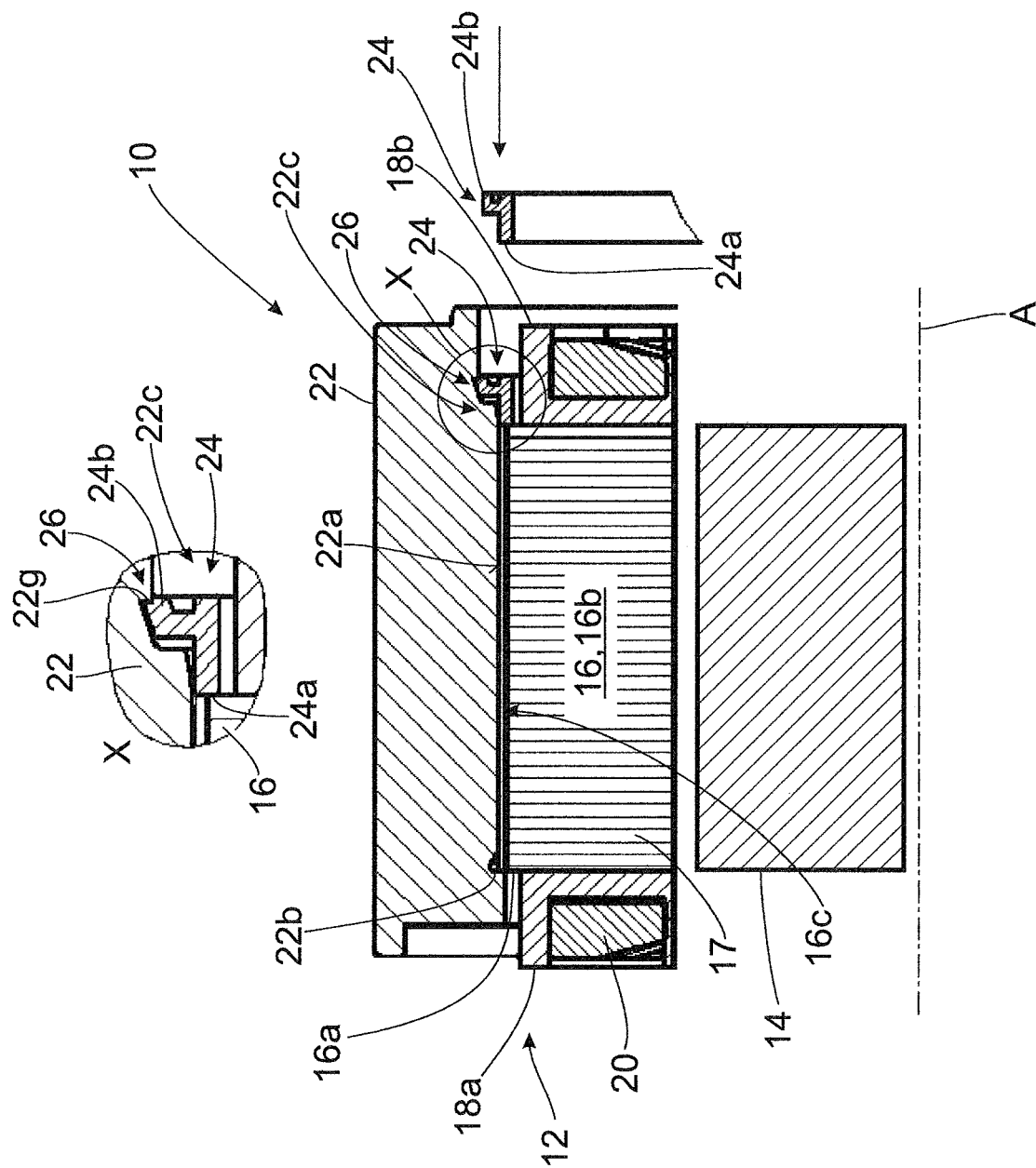
FIG. 4 is a stator component unit of an electric machine with a lamination stack secured to a carrier element together with a supporting element by means of a caulking region formed at the latter.

In contrast to the previous constructions of the caulking region 26, the stator component unit 12 shown in FIG. 4 is formed directly at the supporting element 24. The supporting element 24 is annularly constructed and has a contact portion 24a in axial direction for contacting the lamination stack 16 and a deformable contact portion 24b for axial support at an engagement contour 22g of the carrier element 22. The contact portion 24b is plastically deformed after the insertion of the supporting element 24 at the carrier element 22 into the engagement contour 22g by an axially engaging, wedge-shaped pressing tool, not shown. FIG. 4 shows the supporting element 24 in the undeformed state and in the inserted, deformed state.

Figure 5:
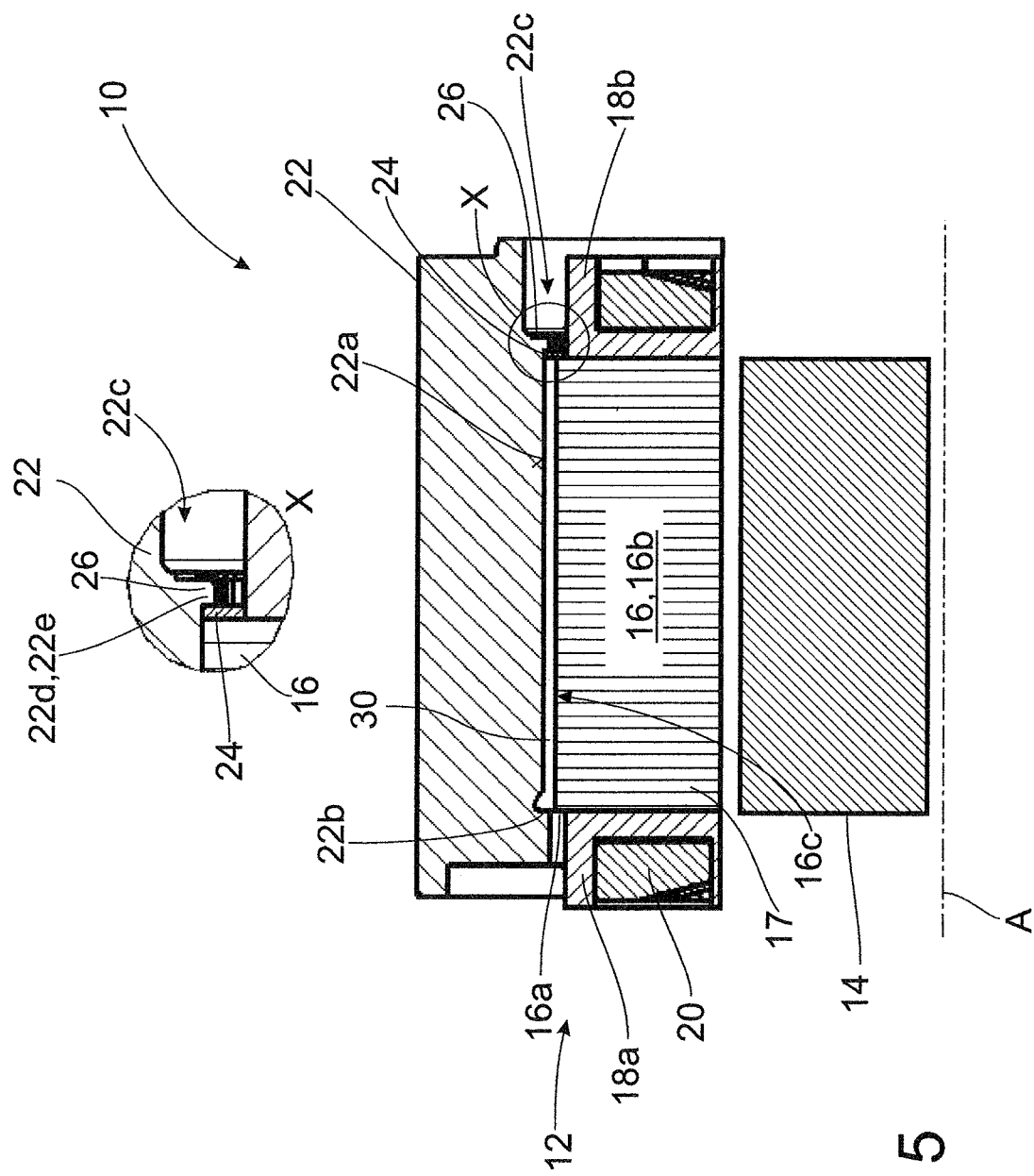
FIG. 5 is a stator component unit according to FIG. 1 in which a sleeve-shaped intermediate element is arranged in a mutual circumferential contact region of the lamination stack and carrier element.

FIG. 5 shows a stator component unit 12 according to FIG. 1 in which a sleeve-shaped intermediate element 30 or sleeve element 30 is arranged in a mutual circumferential contact region of the lamination stack 16 and carrier element 22. This intermediate element 30 can be used, for example, as a remaining assembly aid.

Figure 6:
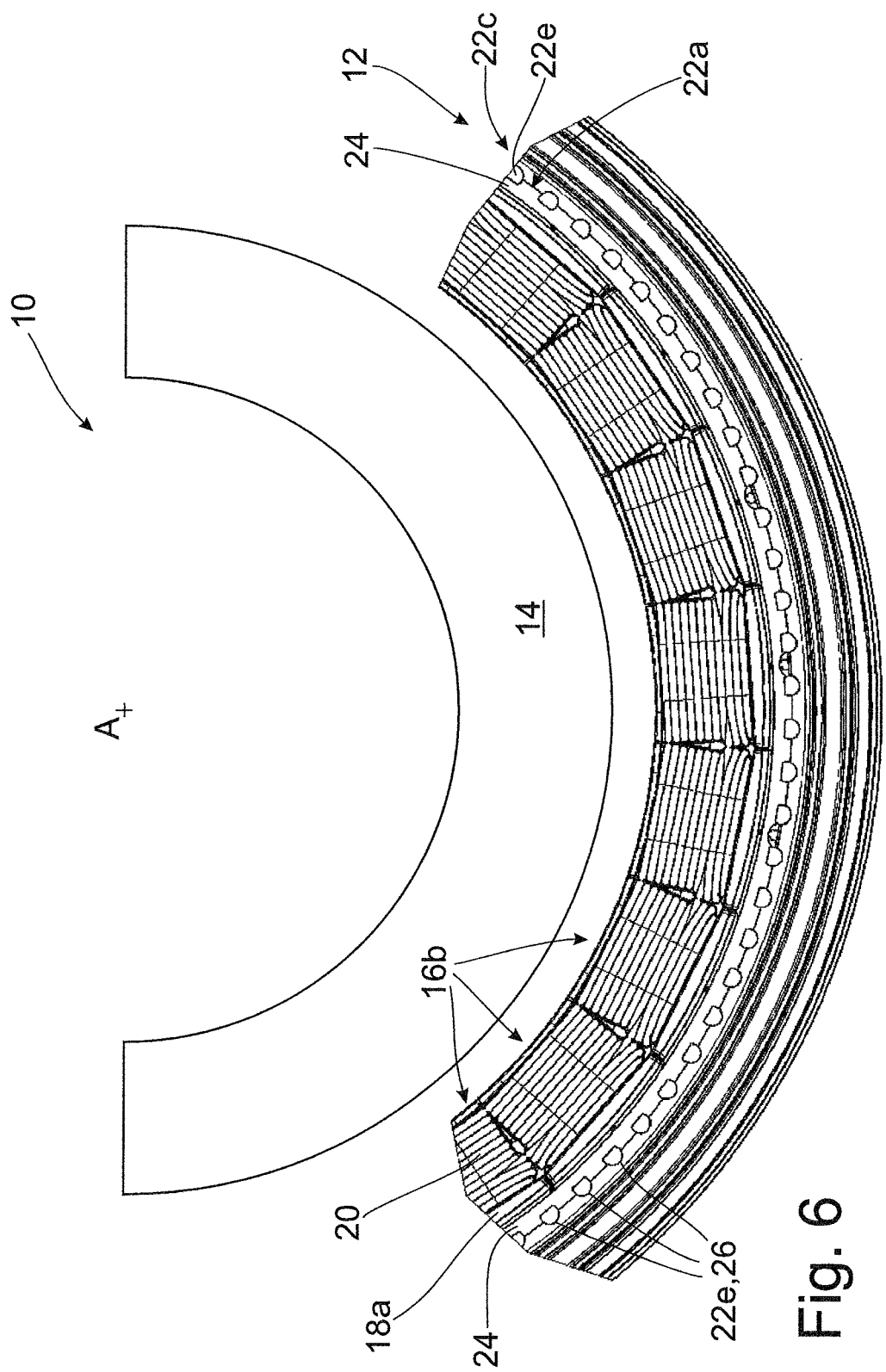
FIG. 6 is a front view of a stator component unit of a plurality of caulking regions formed at the circumference by which a lamination stack is secured to a stator carrier.

A front view of a stator component unit 12 according to FIG. 1 is shown in FIG. 6. The lamination stack 16 is secured to the stator carrier 22 by a plurality of caulking regions 26 formed at the circumference.

The stator component units 12 mentioned with reference to FIGS. 1 to 6 can be realized through a production method having the following steps:
- providing an annular rotor lamination stack 16 or stator lamination stack 16 comprising a plurality of laminations 17, which lamination stack 16 is optionally made up of a plurality of circumferential segments,
- applying an axial, frictionally engaging clamping to the lamination stack 16 by an assembly tool, not shown here,
- axially joining the lamination stack 16 with a carrier element 22 until the lamination stack 16 abuts a first axial stop 22b of the carrier element 22 while maintaining the frictionally engaging clamping, and an interference fit is optionally formed between the joined members 16, 22,
- introducing a supporting element 24 at the axial side of the lamination stack 16 opposite the first stop 22b,
- generating a second axial stop 22c through at least one caulking region 26 by caulking the carrier element 22 or the supporting element 24, and
- detaching the assembly tool.

A corresponding clamp can be used as assembly tool. The clamp has axial contact areas that act on the front sides of the lamination stack and by which the lamination stack is axially compressed and held together. It must merely be ensured that the fastening portion 16c, i.e., in the present case the outer cylindrical surface of the lamination stack 16, remains free for fitting to the carrier 22 and is not covered or otherwise enclosed.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A component unit for an electric machine comprising:
    an annular lamination stack having a plurality of axially stacked laminations;
    a carrier element having a receiving-engagement contour, a cylindrical receiving portion, and two axial stops; and
    a fastening portion configured as one of an inner fastening portion and an outer cylindrical fastening portion and configured to secure the lamination stack to the cylindrical receiving portion,
    wherein the lamination stack is axially clamped in a frictionally engaging manner between the two axial stops, and
    wherein at least one of the axial stops comprises an annular supporting element arranged at the cylindrical receiving portion and is configured to support the lamination stack and is fixed at the carrier element by at least one caulking region, wherein the annular supporting element contacts a free front side of the lamination stack,
    wherein the at least one caulking region is formed at the supporting element, and
    wherein the receiving-engagement contour receives material of the annular supporting element displaced as a result of a caulking process.

2. The component unit according to claim 1, wherein the lamination stack is secured to the cylindrical receiving portion of the carrier element by a yoke area, and wherein the yoke area is at least partially radially overlapped by the supporting element.

3. The component unit according to claim 1, wherein a plurality of caulking regions are formed in circumferential direction of the lamination stack.

4. The component unit according to claim 1, wherein one of the stops is formed by an annular shoulder at the cylindrical receiving portion of the carrier element.

5. The component unit according to claim 1, wherein the lamination stack is secured to the carrier element by an interference fit.

6. The component unit according to claim 1, wherein the carrier element has a different coefficient of thermal expansion than the lamination stack.

7. The component unit according to claim 1, wherein the carrier element is made of an aluminum material.

8. The component unit according to claim 1, wherein the lamination stack comprises a sleeve element arranged on the fastening portion of the lamination stack and is arranged together with the sleeve element at the cylindrical receiving portion of the carrier element.

9. A method for producing a component unit of an electric machine comprising the following steps:
    providing one of an annular rotor lamination stack and a stator lamination stack comprising a plurality of laminations, wherein this lamination stack is made up of a plurality of circumferential segments;
    applying an axial, frictionally engaging clamping to the lamination stack by an assembly tool;
    axially joining the lamination stack with a carrier element having a receiving-engagement contour, until the lamination stack abuts a first axial stop of the carrier element while maintaining the frictionally engaging clamping, wherein an interference fit is optionally formed between the lamination stack and the carrier element;
    introducing a supporting element at the axial side of the lamination stack opposite the first stop;
    generating a second axial stop through at least one caulking region by caulking the carrier element or the supporting element, wherein the supporting element contacts a free front side of the lamination stack; and
    detaching the assembly tool,
    wherein the at least one caulking region is formed at the supporting element, and
    wherein the receiving-engagement contour receives material of the annular supporting element displaced as a result of a caulking process.

10. An electric machine with a stator and a rotor which is supported so as to be rotatable around an axis A relative to the stator, wherein the rotor or the stator comprises a component comprising:
    an annular lamination stack having a plurality of axially stacked laminations;
    a carrier element having a receiving-engagement contour, a cylindrical receiving portion and two axial stops; and
    a fastening portion configured as one of an inner fastening portion and an outer cylindrical fastening portion and configured to secure the lamination stack to the cylindrical receiving portion,
    wherein the lamination stack is axially clamped in a frictionally engaging manner between the two stops, and
    wherein at least one of the axial stops comprises an annular supporting element arranged at the cylindrical receiving portion and is configured to support the lamination stack and is fixed at the carrier element by at least one caulking region, wherein the annular supporting element contacts a free front side of the lamination stack,
    wherein the at least one caulking region is formed at the supporting element, and
    wherein the receiving-engagement contour receives material of the annular supporting element displaced as a result of a caulking process.

* * * * *